(12) United States Patent
Lemke

(10) Patent No.: US 11,149,944 B2
(45) Date of Patent: Oct. 19, 2021

(54) BURNER FOR THE COMBUSTION OF MATERIAL FOR COMBUSTION IN THE FORM OF A COMMINUTED WOOD PRODUCT, IN PARTICULAR OF FINE MATERIAL

(71) Applicant: SWISS KRONO TEC AG, Lucerne (CH)

(72) Inventor: Hartmut Lemke, Kantow (DE)

(73) Assignee: SWISS KRONO TEC AG, Lucerne (CH)

(*) Notice: Subject to any disclaimer, the term of this patent is extended or adjusted under 35 U.S.C. 154(b) by 147 days.

(21) Appl. No.: 16/614,222

(22) PCT Filed: May 28, 2018

(86) PCT No.: PCT/EP2018/063943
§ 371 (c)(1),
(2) Date: Nov. 15, 2019

(87) PCT Pub. No.: WO2018/219871
PCT Pub. Date: Dec. 6, 2018

(65) Prior Publication Data
US 2020/0173657 A1    Jun. 4, 2020

(30) Foreign Application Priority Data
May 29, 2017   (EP) ..................... 17173281

(51) Int. Cl.
*F23G 7/10*   (2006.01)
*F23G 5/16*   (2006.01)
*F23G 5/46*   (2006.01)

(52) U.S. Cl.
CPC .............. *F23G 7/105* (2013.01); *F23G 5/16* (2013.01); *F23G 5/46* (2013.01);
(Continued)

(58) Field of Classification Search
CPC ............ F23G 7/105; F23G 2203/8013; F23G 2205/121; F23G 2209/261; F23G 2900/50209
See application file for complete search history.

(56) References Cited

U.S. PATENT DOCUMENTS 3,865,053 A * 2/1975 Kolze .................... F23G 7/105
110/186
3,935,824 A * 2/1976 Gibeault ................. F23G 5/14
110/207

(Continued)

FOREIGN PATENT DOCUMENTS

DE   102007017101   10/2008
EP       0906542    4/1999
(Continued)

OTHER PUBLICATIONS

International Search Report in related International Application No. PCT/EP2018/063943 dated Jun. 12, 2018, 5 pages.
(Continued)

*Primary Examiner* — David J Laux
(74) *Attorney, Agent, or Firm* — Andrew M. Calderon; Roberts Calderon Safran & Cole, P.C.

(57) ABSTRACT

The disclosure relates to a burner for burning combustible material in the form of a comminuted wood product, especially fine material, with (a) a combustible material feed for supplying the combustible material, (b) a screw conveyor for conveying the combustible material, (c) a combustion zone, wherein the screw conveyor is arranged to convey the combustible material (18) from the combustible material feed (20) to the combustion zone, (d) an air feed for supplying air to the combustion zone, and (e) a burner mouth for leading combustion gases out of the combustion zone. According to the disclosure, a compacting zone is provided, which is configured behind the combustible material feed (Continued)

and in front of the combustion zone in the direction of material flow (M) of the combustible material, wherein an auger of the screw conveyor and the compacting zone are preferably designed to compress the combustible material in the compacting zone.

12 Claims, 2 Drawing Sheets

(52) U.S. Cl.
CPC ............... *F23G 2202/103* (2013.01); *F23G 2203/8013* (2013.01); *F23G 2205/121* (2013.01); *F23G 2206/203* (2013.01); *F23G 2209/261* (2013.01)

(56) References Cited

U.S. PATENT DOCUMENTS

| | | | | |
|---|---|---|---|---|
| 6,276,286 | B1* | 8/2001 | Williams | F23G 5/033 110/101 C |
| 2004/0134397 | A1* | 7/2004 | Ingvarsson | F23B 1/38 110/347 |
| 2007/0289509 | A1* | 12/2007 | Vera | C10K 1/12 110/250 |
| 2014/0069798 | A1* | 3/2014 | Hayward | C10B 49/02 201/8 |
| 2014/0155245 | A1* | 6/2014 | Hiramatsu | F23G 7/001 494/7 |
| 2014/0175335 | A1* | 6/2014 | Anderson | F23G 5/0276 252/373 |
| 2015/0362184 | A1* | 12/2015 | Tait | F23G 5/033 110/345 |
| 2017/0145314 | A1* | 5/2017 | Parkinson | C10B 5/00 |
| 2017/0336070 | A1* | 11/2017 | Inskip | F23D 91/02 |
| 2018/0022554 | A1* | 1/2018 | Faber | C10J 3/50 264/517 |

FOREIGN PATENT DOCUMENTS

| | | |
|---|---|---|
| EP | 1331443 | 7/2003 |
| EP | 2657598 | 10/2013 |
| FR | 2727744 | 6/1996 |
| JP | 2010096446 | 4/2010 |
| RU | 2129687 | 4/1999 |
| RU | 104668 | 5/2011 |

OTHER PUBLICATIONS

Written Opinion in related International Application No. PCT/EP2018/063943 dated Jun. 12, 2018, 7 pages.

\* cited by examiner

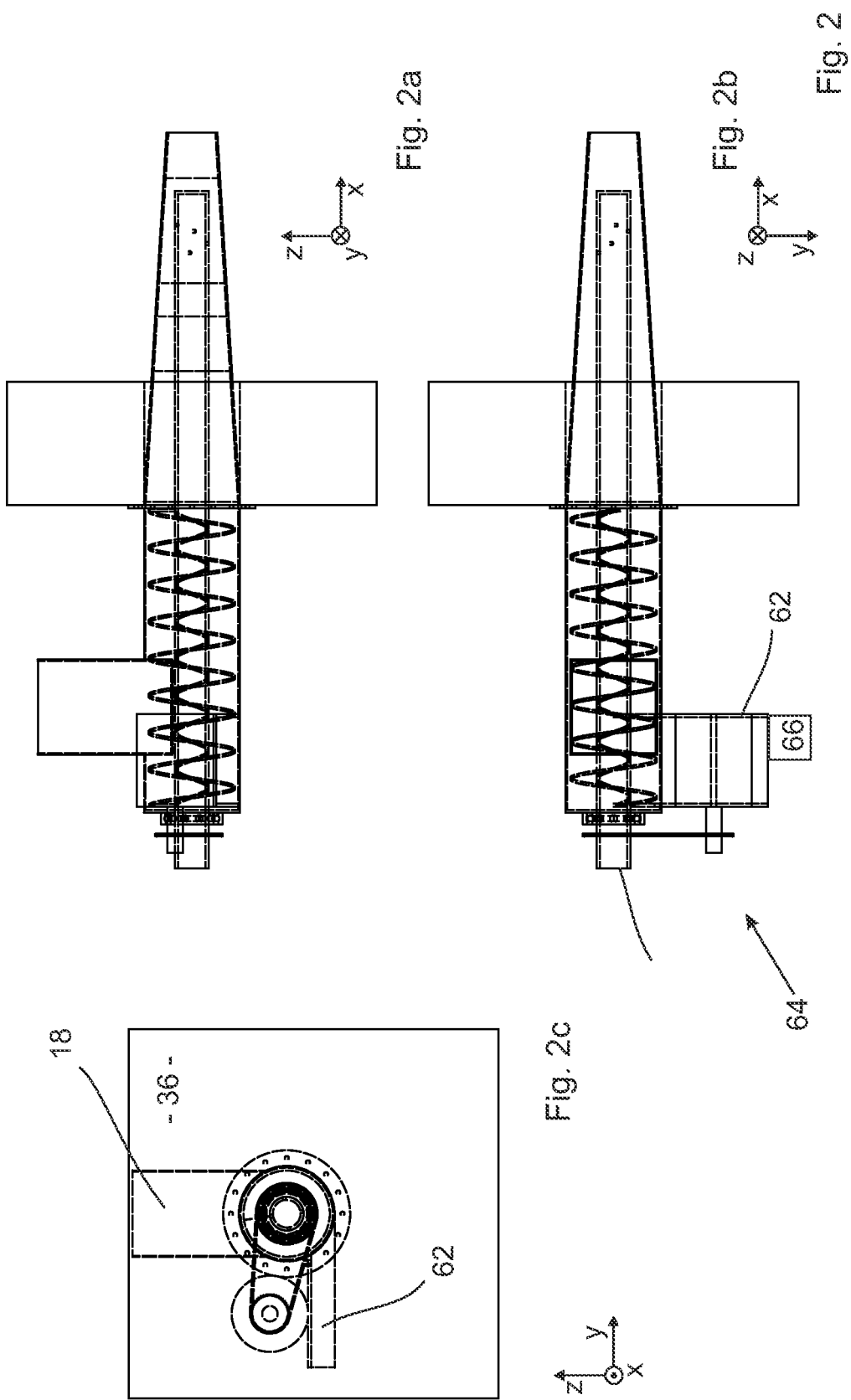

BURNER FOR THE COMBUSTION OF MATERIAL FOR COMBUSTION IN THE FORM OF A COMMINUTED WOOD PRODUCT, IN PARTICULAR OF FINE MATERIAL

FIELD OF INVENTION

The invention relates to a burner for burning combustible material in the form of a comminuted material product, especially fine material, according to the generic term in claim 1. Fine material refers to wood particles that have a small diameter, for instance a maximum of 3 mm, wherein the length of the particles of the fine material is generally shorter than 40 mm. This type of fine material is generated in sawmills, for example, and during the production of wood material panels. Since process heat is also required during the production of wood material panels, residual materials, and thus also the fine material, are generally burned.

BACKGROUND OF INVENTION

Here, the burning of fine material is problematic. Due to the small size of the particles, the fine material in the furnace is easily entrained by the air stream and therefore leaves the firing chamber very quickly. The time in the firing chamber is generally not long enough to ignite the fine material, as it often has a high water content. As a result, a large proportion of the combustion occurs behind the firing chamber and especially in the flue gas cleaning system arranged downstream from said firing chamber. On the one hand, this means that any heat generated during the burning process cannot be used to generate steam; on the other hand, it renders the cleaning of flue gas more difficult.

FR 2 727 744 A1 describes a fine material burner, with which the fine material that is to be burned is transported to a combustion zone via a screw and then mixed with combustion air in said combustion zone. The disadvantage of such a system is the risk of ash adhesions.

EP 1 331 443 A1 describes a device for introducing secondary combustible materials into a combustion system that uses a screw conveyor as an airlock, wherein said screw conveyor features a sealing zone, said sealing zone preventing flue gases or fire from escaping the firing chamber through the combustible material feed. This type of burner is not suitable for fine material.

DE 10 2007 01 71 01 A1 describes a solid material burner in which material that is to be burned is burned in a rotary kiln. Such a burner is not really suitable for fine material as the material is easily entrained due to the high gas speeds in a combustion boiler.

SUMMARY OF INVENTION

The invention aims to improve the burning of comminuted wood material products, especially fine material.

The invention solves the problem by way of a burner for burning combustible material in the form of a comminuted wood product, especially of fine material with (a) a combustible material feed for supplying the combustible material, (b) a screw conveyor for conveying the combustible material, (c) a combustion zone, wherein the screw conveyor is arranged to convey the combustible material from the combustible material feed to the combustion zone, (d) an air feed for supplying air to the combustion zone, and (e) a burner mouth for leading combustion gases out of the combustion zone. According to a preferred embodiment, the burner (f) has a compacting zone that is configured behind the combustible material feed and in front of the combustion zone in the direction of material flow of the combustible material, wherein (g) an auger of the screw conveyor and the compacting zone are preferably designed to compress the combustible material in the compacting zone.

Specifically, the air feed is designed in such a way that it does not release any air into the screw conveyor. In particular, the air feed only releases air into the combustion zone.

The invention also solves the problem by way of a steam boiler system with (a) a steam boiler, (b) a wall which surrounds a firing chamber, and (c) a burner as stated above, the combustible material feed of which is arranged outside of the firing chamber, wherein (d) the burner protrudes by way of its compacting zone into the firing chamber. The invention also solves the problem by way of a method for burning fine material, in which a burner according to the invention is used.

The advantage of the invention is that the fine material is burned in the combustion zone and thus at least predominantly inside the burner. In other words, only the combustion gases leave the burner, but not unburned particles of the fine material. On the one hand, this means that the combustion heat of the fine material can be used; on the other hand, it renders the cleaning of flue gases easier.

Within the scope of the present invention, a comminuted wood product should be understood to mean, for example, any material that was produced via the comminuting of wood, especially via machining. Fine material should be understood particularly to mean a comminuted wood product for which it can be said that 90% by weight of the particles have a maximum enveloping cylinder diameter of 4 mm, in particular a maximum of 2 mm. The enveloping cylinder should be understood to mean the conceived cylinder of minimal volume that completely surrounds the corresponding particle. Preferably, the length of the enveloping cylinder is a maximum of 35 mm, especially a maximum of 25 mm, for at least 90% by weight of the particles of the fine material. Alternatively or additionally, at least 90% by weight of the particles which make up the fine material have a maximum aerodynamic diameter of 5 mm.

The screw conveyor is a closed screw conveyor which features a conveyor line that runs in a cylinder. The screw conveyor is preferably a single screw conveyor, i.e. it has only one auger. However, it is also possible that the screw conveyor is, for instance, a dual screw conveyor. In this case, the augers can be designed to rotate uniformly or in the opposite direction to one another.

The combustion zone should be understood especially to mean a section of the burner in which an oxidising of wood occurs, or more specifically of wood gas that is produced during the carbonisation of wood. In combination with the cylinder, in which the at least one auger of the screw conveyor runs, the combustion zone forms a common space and preferably lies in behind of said cylinder. A cross-sectional surface of the combustion zone is preferably a maximum of 20% larger than a cross-sectional surface of the cylinder. It is especially practical if the cross-sectional surface of the combustion zone corresponds—at most—to the cross-sectional surface of the cylinder.

The burner has a compacting zone that is configured behind the combustible material feed and in front of the combustion zone in the direction of material flow of the combustible material, wherein an auger of the screw conveyor and the compacting zone are preferably designed to compress the combustible material in the compacting zone. In other words, the screw conveyor is arranged such that the combustible material which it transports first passes the compacting zone and is then pressed into the combustion zone by subsequently pressed combustible material. The particles of the combustible material are compressed in the compacting zone. In other words, air is forced out of them.

The compacting zone is designed in such a way that neither burning nor carbonisation of the combustible material takes place there. However, it is possible and preferable for the burner to be arranged such that a temperature in the compacting zone is so high that any water present in the combustible material evaporates.

Preferably, the compacting zone has a cross-section that tapers, in particular in a monotonic manner, in the direction of material flow. This leads to a compression of the combustible material in the compacting zone.

Alternatively or additionally, the auger has a reducing pitch in the compacting zone. In this case, the compacting zone is part of the conveyor area in which the auger is arranged. Here, it is possible, but not necessary, for the compacting zone to also have a tapering cross-section. It is possible that the auger has a reducing pitch in its rear area in the direction of material flow, such that the combustible material is compressed and/or that the cylinder, in which the auger runs, tapers in its cross-section in the direction of material flow and/or that an area is attached behind the auger in which the cross-sectional surface at least partially reduces. It has been proven that it can be beneficial to only compress the fine material a little in the compacting zone.

The screw conveyor preferably features an electric drive, which is configured to automatically keep a torque acting on the auger at a constant. For example, the electric drive comprises an electric motor and a drive unit that features a frequency converter and is designed to drive the electric motor using electrical energy, wherein the frequency of said electric motor causes a constant torque to act on the auger. In particular, the electric motor refers to an asynchronous motor, the torque of which can be adjusted by means of the slip.

The combustible material feed preferably comprises a filling monitoring unit, wherein the drive unit is designed to drive the electric motor, such that the screw conveyor is always filled with combustible material. To ensure that the burning of the combustible material occurs exclusively in the combustion zone and does not penetrate into the combustible material feed against the direction of material flow, it is practical for the burner to always be completely full in the vicinity of the auger. As a result, the oxygen concentration in the combustible material is so low that burning is prevented.

The invention also includes a steam boiler system with a steam boiler for producing steam; a wall that surrounds a firing grate, wherein the steam boiler is heated by means of a fire in the firing chamber; and a burner according to the invention, the combustible material feed of which is arranged outside of the firing chamber.

The burner protrudes protrudes into the firing chamber at least by way of its combustion zone. The advantage of this is that the combustion heat in the firing chamber causes the evaporation of water in the combustible material in the combustion zone and/or in the compacting zone. A housing of the burner should be made of heat-resistant stainless steel in the vicinity of the combustion zone and/or the compacting zone.

Preferably, the burner protrudes by way of its compacting zone into the firing chamber. To enable the simple burning of combustible material that is not fine material, the steam boiler system preferably comprises a firing grate, especially a travelling grate. The burning of combustible material that is coarser than the fine material provides, in particular, the heat that causes water in the fine material to evaporate, such that the dried fine material in the combustion zone burns at a high temperature.

The invention also includes a wood material panel production system with a wood comminution system that, during operation, produces a comminuted wood product; a classification device for separating fine material from the comminuted wood product in such a way that at least a fraction of coarse material remains; a steam boiler system according to the invention, the burner of which is connected to the classification device for the feeding of fine material and the firing grate of which is connected to the classification device for the feeding of coarse material. It is possible, but not necessary, for the entirety of the coarse material to be burned. In particular, it is also possible that a part of the coarse material is used to produce wood material panels. To this end, the wood material panel production device preferably has corresponding machines, such as a press and/or a wood defibration device.

Within the scope of a method according to the invention, fine material is preferably burned in the burner, said fine material having a wood moisture content of at least 50% and at most 120%.

The temperature in the firing chamber is preferably at least 850 C.°, which leads to a high degree of thermal efficiency.

Within the scope of a method according to the invention, the combustible material is first compressed in the compacting zone by means of the screw conveyor. Any water present in the combustible material is than evaporated. Specifically, this occurs due to the ambient temperature in the firing chamber and the resulting flow of heat from the firing chamber into the compacting zone. The combustible material then gasifies, thereby producing wood gas. The wood gas is then burned by supplying air in the combustion zone. The hot flue gases leave the burner through the burner mouth.

BRIEF DESCRIPTION OF DRAWINGS

In the following, the invention will be explained in more detail by way of the attached figures. They show FIG. 1 a schematic view of a wood material panel production system according to the invention with an isometric cross-section through a burner according to the invention, and FIG. 2 in the partial FIGS. 2*a*, 2*b* and 2*c*, further views of the burner according to FIG. 1.

DETAILED DESCRIPTION

Figure 1:
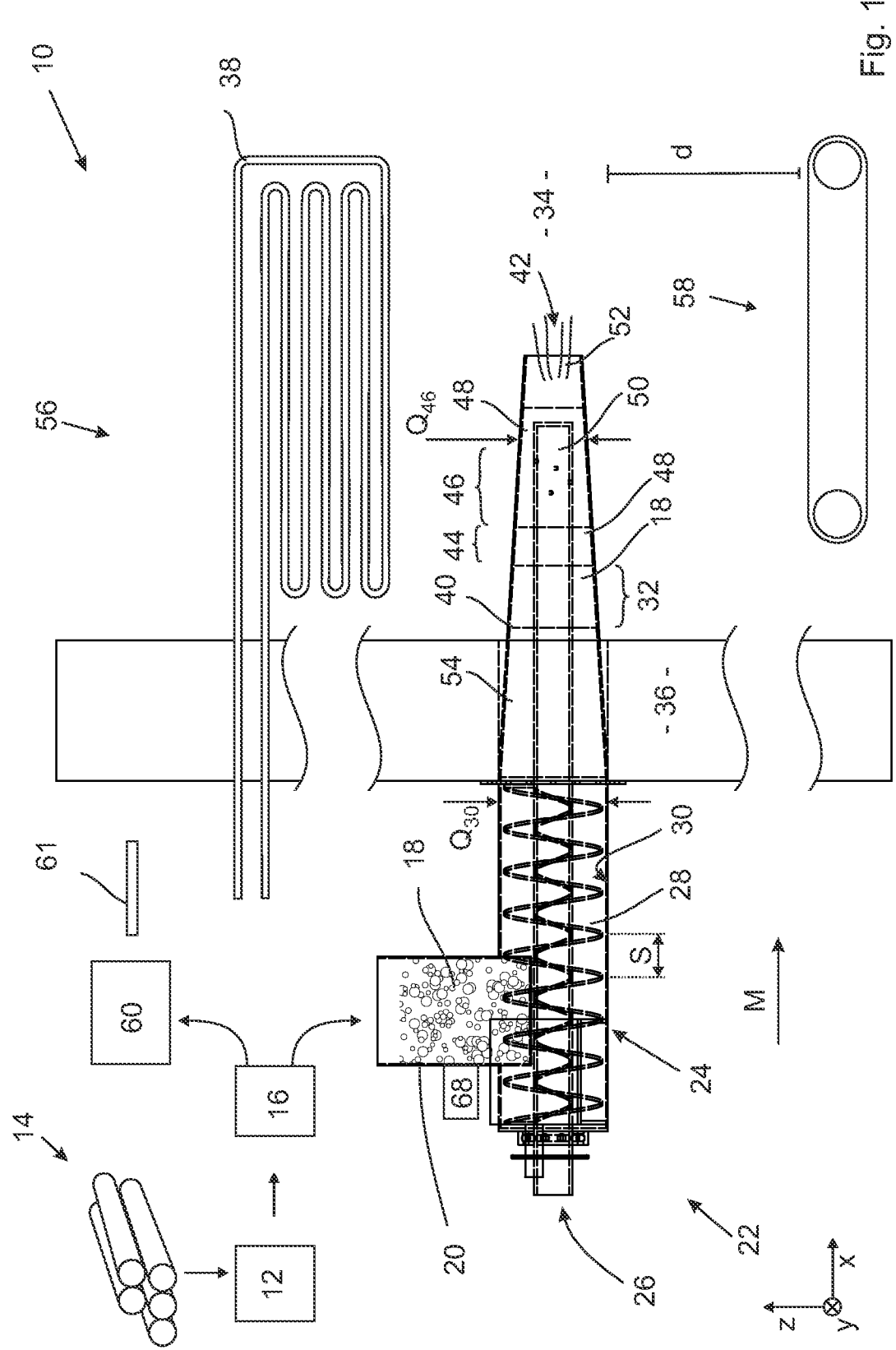

FIG. 1 depicts a wood material panel production system 10 according to the invention with a wood communition system 12 for comminuting wood 14. The wood communition system 12 may comprise, for instance, a chipper or a saw and produces a comminuted wood product that, in the present case, is fed to an optional classification device 16, for example in the form of an air sifter. As a result, the fine material 18 is separated and a combustible material feed 20 fed, said combustible material feed being formed, in the present case, by a fuel shaft.

The combustible material feed 20 is part of a burner 22 according to the invention that also features a screw conveyor 24 and an air feed 26. The screw conveyor 24 comprises an auger 28 that is mounted in a cylinder 30.

During operation of the auger 28, the fine material 18 is conveyed in a direction of material flow M towards a compacting zone 32.

The compacting zone 32 is situated in a firing chamber 34, a temperature $T_{34}$ of which is at least $T_{34}=850$ C.° during operation of the installation. The firing chamber 34 is restricted by a wall 36 and contains a steam boiler 38 which, in the present case, is formed by high-pressure and high-temperature resistant pipes.

A density of the fine material 18 increases in the compacting zone 32. As a result, any air present in the fine material is displaced in and against the direction of material flow M. In addition, the fine material 18 is heated, due to the fact that heat from the firing chamber 34 spreads through a housing 40 until it reaches the fine material 18 in the compacting zone 32. The resulting water vapour leaves the burner 22 through a burner mouth 42. The burner mouth 42 is arranged above an upper edge of the firing grate 58. For example, a distance d between the burner mouth 42 and the upper edge of the firing grate 58 is at least 3 m and at most 15 m.

In the direction of material flow M behind the compacting zone 32, the burner 22 has a gasification zone 44, in which the fine material 18 is gasified. This produces wood gas, which flows into a combustion zone 46. In the combustion zone, air is supplied by means of the air feed 26, such that wood gas 48 and air 50 react with one another. In other words, the wood gas burns and combustion gases 52 form, which escape through the burner mouth 42 and heat the steam boiler 38.

FIG. 1 shows that the combustible material feed 20 and the auger 28 are situated outside of the firing chamber 34, which represents a preferred embodiment. Conversely, the burner 22 protrudes so far into the firing chamber 34 that the compacting zone, the gasification zone 44 and the combustion zone 46 are all arranged in the firing chamber 34.

In the present case, the auger 28 has a constant pitch. A reaction zone 54 is attached directly behind the cylinder 30, which is designed to be cylindrical in the present case; the compacting zone 32, the gasification zone 44 and the combustion zone 46 are designed to be in said reaction zone. In the reaction zone 54, the inner cross-section reduces in the direction of material flow M. This results in a compression of the fine material 18, as described above.

FIG. 1 schematically depicts that the steam boiler 38, the wall 36 and the burner 22 are part of a steam boiler system 56, which also comprises a firing grate 58. This is fed with comminuted wood products that are not fine material. In other words, coarse material is burned by means of the firing grate 58, wherein the problems associated with the burning of fine material 18 do not exist with the burning of said coarse material.

FIG. 1 schematically shows that a production unit 60 is provided in the direction of material flow behind the classification device 18 for producing wood material panels 61 from comminuted wood products, which originate from the wood communition system 12. The production unit 60 may comprise, for instance, a wood defibration device as well as a double-belt press. This is heated by, for example, thermal oil, which has been heated in the steam boiler system. Such production units 60 belong to the prior art and are therefore not described any further.

FIG. 2*a* depicts the burner according to FIG. 1. FIG. 2*b* shows a view from below, in which an electric motor 62 is arranged to drive the auger 28; in the present case, this is achieved by means of a drive chain. The electric motor 62 is part of an electric drive 64, which also comprises a control unit 66 that features a frequency converter and that supplies the electric motor 62 with electrical energy of a variable frequency f. The electric motor 62 is an asynchronous motor, the roatation speed ω and torque M of which can be regulated using the frequency f. In the present case, the torque M is feedback controlled to a target torque $M_{Soll}$.

During operation, the auger 28 conveys the fine material 18 in the direction of material flow M towards the firing chamber 34. Due to the tapering reaction zone 54, the fine material 18 becomes blocked in the compacting zone 32. The exact position of the compacting zone 32 relative to the auger 28 can be adjusted by means of the target torque $M_{Soll}$. The higher the target torque $M_{Soll}$ and thus the torque M that is actually acting on the auger 28, the further the blocking point is displaced towards the burner mouth 42.

The fine material 18 remains in the compacting zone 32 until the heat of the surroundings has evaporated the moisture out of the fine material 18. Due to the continued heat supply, the fine material 18 in the gasification zone 44 begins to gasify. This reduces the volume of the fine material 18, such that it moves further forwards in the direction of material flow. As a result, the torque M that the auger has to apply reduces. Consequently, the auger rotates once again and conveys more fine material 18 in the direction of material flow. A nominal conveying capacity of the screw conveyor 24 is at least 2 tonnes of combustible material per hour, preferably at least 3 tonnes of combustible material per hour.

It should be noted that the present description predominantly refers to fine material. However, it may also be possible, by means of the burner 22 according to the invention, to burn combustible material in the form of comminuted wood products that is coarser than fine material.

FIG. 1 shows that the burner 22 has a filling monitoring device 68 that measures the filling level of the combustible material 18 in the combustible material feed. For example, the filling monitoring device 68 has a light barrier or an ultrasound sensor or a different sensor for measuring the filling level.

If a pre-determined critical filling level is not reached, said filling level being selected such that, in the event that this filling level is not reached, it is not longer guaranteed that the cylinder 30 is continuously filled with combustible material 18, the filling monitoring device 68 emits a signal to the control unit 66, such that this control unit reduces a rotational frequency n of the electric motor 62, where applicable to zero. If the critical filling level is exceeded, the control unit 66 feedback controls the electric motor back to the target torque $M_{soll}$.

The invention claimed is:

1. A burner for burning combustible material in the form of a comminuted wood product comprising:
   (a) a combustible material feed which feeds the combustible material,
   (b) a screw conveyor which conveys the combustible material,
   (c) a combustion zone, wherein the screw conveyor is arranged to convey the combustible material from the combustible material feed to the combustion zone,
   (d) an air feed which feeds air into the combustion zone,
   (e) a burner mouth which discharges combustion gases out of the combustion zone,
   (f) a compacting zone that is arranged behind the combustible material feed and in front of the combustion zone in a direction of material flow of the combustible material, and (g) an auger of the screw conveyor and the compacting zone to compress the combustible material in the compacting zone,
wherein the screw conveyor includes an electric drive, which is configured to automatically keep a torque acting on the auger at a constant.

2. The burner according to claim 1, further comprising a gasification zone which gasifies the combustible material, the gasification zone being arranged behind the compacting zone in a direction of material flow.

3. The burner according to claim 1, wherein the compacting zone includes a tapering cross-section in the direction of material flow.

4. The burner according to claim 1, wherein the auger has a decreasing pitch in the compacting zone.

5. The burner according to claim 1, wherein the electric drive comprises:
an electric motor; and
a control unit, which features a frequency converter and is configured to automatically keep the torque acting on the auger at the constant.

6. The burner according to claim 5, wherein the combustible material feed has a filling monitoring device,
wherein the control unit is designed to control the electric motor in such a way that the screw conveyor is always filled with the combustible material.

7. A steam boiler system comprising:
(a) a steam boiler,
(b) a wall which encloses a firing chamber,
(c) a burner according to claim 1, whose combustible material feed is arranged outside of the firing chamber, and
(d) wherein the burner protrudes into the firing chamber by way of its compacting zone.

8. A wood material panel production system comprising
a wood comminution system that produces a comminuted wood product during operation,
a classification device for separating fine material from the comminuted wood material such that coarse material remains,
the steam boiler system according to claim 7,
wherein the burner is connected to the classification device which feeds of the fine material and a firing grate is connected to the classification device which feeds coarse material.

9. A method for burning fine material for which a burner according to claim 1 comprising:
compressing of the combustible material in the compacting zone by the screw conveyor,
evaporation of water held in the combustible material,
gasification of the combustible material, thereby producing a wood gas, and
burning of the wood gas in the air that is supplied by the air feed.

10. The method according to claim 9, further comprising a temperature ($T_{34}$) in a firing chamber of the burner being at least 850° C.

11. A steam boiler system comprising:
(a) a steam boiler,
(b) a wall which encloses a firing chamber,
(c) a burner for burning combustible material in the form of a comminuted wood product, comprising:
(i) a combustible material feed for feeding the combustible material,
(ii) a screw conveyor for conveying the combustible material,
(iii) a combustion zone, wherein the screw conveyor is arranged to convey the combustible material from the combustible material feed to the combustion zone,
(iv) an air feed for feeding air into the combustion zone,
(v) a burner mouth for discharging combustion gases out of the combustion zone, and
(d) the burner having a compacting zone that is arranged behind the combustible material feed and in front of the combustion zone in a direction of material flow of the combustible material,
(e) wherein the combustible material feed is arranged outside the firing chamber and that
(f) the burner protrudes into the firing chamber with its compacting zone.

12. A method for burning fine material using the steam boiler system according to claim 11, wherein:
fine material is fed by means of the combustible material feed and is then fed from the combustible material feed to the combustion zone by means of the screw conveyor, and
air is fed to the combustion zone and combustion gases are discharged from the combustion zone through the burner mouth.

\* \* \* \* \*